(12) United States Patent
Torrison

(10) Patent No.: US 9,789,798 B2
(45) Date of Patent: Oct. 17, 2017

(54) STICK REMOVAL MECHANISM FOR NUT HARVESTING

(71) Applicant: Mark E. Torrison, Yuba City, CA (US)

(72) Inventor: Mark E. Torrison, Yuba City, CA (US)

( * ) Notice: Subject to any disclaimer, the term of this patent is extended or adjusted under 35 U.S.C. 154(b) by 67 days.

(21) Appl. No.: 14/993,000

(22) Filed: Jan. 11, 2016

(65) Prior Publication Data

US 2016/0214523 A1 Jul. 28, 2016

Related U.S. Application Data

(60) Provisional application No. 62/108,988, filed on Jan. 28, 2015.

(51) Int. Cl.
*B60P 1/36* (2006.01)
*B60P 1/38* (2006.01)
*A01D 51/00* (2006.01)

(52) U.S. Cl.
CPC .............. *B60P 1/38* (2013.01); *A01D 51/002* (2013.01); *B60P 1/36* (2013.01)

(58) Field of Classification Search
CPC ....... A01D 51/002; A01D 51/00–51/07; B60P 1/36; B60P 1/10; B60P 1/34; B60P 1/40
USPC ....... 56/328.1; 209/632, 393, 396, 397, 307, 209/308, 404, 920, 241, 247
See application file for complete search history.

(56) References Cited

U.S. PATENT DOCUMENTS

| 1,791,362 | A |   | 2/1931  | La Forge |
|-----------|---|---|---------|----------|
| 2,468,639 | A | * | 4/1949  | Sample ................. A01D 17/10 171/127 |
| 2,515,966 | A | * | 7/1950  | Polisena ............. A01D 51/002 171/120 |
| 3,863,431 | A | * | 2/1975  | Fowler .................. A01D 45/10 56/11.9 |
| 3,964,244 | A |   | 6/1976  | Vallicella |
| 4,147,017 | A |   | 4/1979  | Cortopassi et al. |
| 4,569,188 | A | * | 2/1986  | Alper ................... A01D 45/006 209/308 |
| 4,642,977 | A |   | 2/1987  | Ramacher |
| 4,884,393 | A | * | 12/1989 | Hilleby .................. A01D 61/02 198/834 |
| 4,982,559 | A |   | 1/1991  | Calais |
| 5,001,893 | A |   | 3/1991  | Stanley et al. |
| 5,373,688 | A |   | 12/1994 | Stanley et al. |
| 5,421,147 | A |   | 6/1995  | Holden et al. |

(Continued)

*Primary Examiner* — John G Weiss
(74) *Attorney, Agent, or Firm* — Richard C. Litman

(57) ABSTRACT

The stick removal mechanism for nut harvesting includes a frame having opposing side members and sprockets mounted on the side members. A roller chain is mounted on the sprockets on each side of the frame. A plurality of cross members having fingers extending therefrom is attached to and extends between the roller chains for travel therewith. A plurality of cross members and their chains define an endless conveyor belt. An adjustable agitator mechanism is installed upon each of the side members, which adjusts corresponding agitator sprockets to lift and agitate the respective roller chains. The stick removal mechanism is installed over the open top of a collector receptacle, e.g., a cart, so that debris is carried atop the conveyor and dropped behind the cart while nuts fall through the passages between the fingers and into the receptacle.

19 Claims, 6 Drawing Sheets

(56) References Cited

U.S. PATENT DOCUMENTS

| | | | | |
|---|---|---|---|---|
| 5,924,217 | A * | 7/1999 | Peeters | F26B 17/045 34/236 |
| 6,382,424 | B1 * | 5/2002 | Bolton | B06B 1/16 209/366.5 |
| 7,850,010 | B2 * | 12/2010 | Takev | B07B 1/12 209/393 |
| 7,921,628 | B2 * | 4/2011 | Meester | A01D 45/006 171/27 |
| 2004/0129536 | A1 * | 7/2004 | Kankaanpaa | B07B 1/12 198/750.2 |

* cited by examiner

US 9,789,798 B2

STICK REMOVAL MECHANISM FOR NUT HARVESTING

CROSS-REFERENCE TO RELATED APPLICATION

This application claims the benefit of U.S. Provisional Patent Application Ser. No. 62/108,988, filed Jan. 28, 2015.

BACKGROUND OF THE INVENTION

1. Field of the Invention

The present invention relates generally to crop harvesting, and particularly to a stick removal mechanism for nut harvesting.

2. Description of the Related Art

Agricultural nut harvesting generally involves a nut harvesting machine and an accompanying reservoir or receptacle, generally a cart or similar mobile container. As the nut harvesting machine travels through the orchard and collects the nuts, sticks and other large debris can accumulate along with the nuts. The nuts and the associated debris are loaded into the accompanying reservoir cart by a conveyor belt or other mechanism as the nuts are collected by the harvester.

Generally, a device is placed atop the cart to separate the sticks and other debris from the nuts, so that the nuts can pass through the device and into the cart for collection. These devices are typically referred to as "de-stickers." Current devices for separating the debris from the nuts have drawbacks. For example, current devices have grates made of parallel bars connected perpendicularly by smaller welded bars called fingers. The fingers and the parallel bars form fixed shape passages so that the nuts can pass through. Unfortunately, debris can become lodged into these fixed shape passages, which can cause deformation and other damage to the bars.

Another problem occurs when nuts do not pass into the cart for various reasons, such as being lodged in a void. Typically, the device is agitated so that these nuts are shaken loose to fall into the cart. However, when the device is agitated, any remaining debris is also agitated and can pass into the cart with the nuts.

Thus, a stick removal mechanism for nut harvesting solving the aforementioned problems is desired.

SUMMARY OF THE INVENTION

The stick removal mechanism for nut harvesting includes a frame having opposite parallel side members. Sprockets are mounted on the side members of the frame. Endless roller chains are mounted on the sprockets. A plurality of rigid cross members having fingers extending therefrom is attached to and extends between the roller chains for rotation therewith. The chains, cross members, and fingers define an endless conveyor belt. The cross members may be made from elongated rectangular steel bar stock and steel plate having the fingers extending therefrom, the bar stock and plate components being immovably affixed to one another, e.g., welded, to form each cross member.

An agitator mechanism is installed upon each of the frame side members to agitate the chain, and thus the belt, as it passes thereover. Each agitator includes a sprocket of relatively small diameter and relatively few teeth that adjustably engages the overlying roller chain. The agitator mechanisms adjust the height of their respective sprockets. Higher sprocket settings result in greater offset of the chains. The relatively few teeth of each sprocket result in the respective chain being oscillated up and down as the alternating sprocket teeth and gaps therebetween rotate beneath the chain.

The stick removal mechanism is installed across or over the open top of a collector receptacle, generally a mobile cart or trailer or the like. The receptacle is pulled through the orchard by a suitable machine, e.g., a tractor. Another machine picks up nuts, as well as sticks and/or other debris, from the ground and deposits them atop the stick removal mechanism. The endless conveyor belt of the stick removal mechanism captures the sticks and/or other debris and drops them beyond the cart or receptacle. The nuts fall through the passages defined between adjacent fingers of the crossmembers forming the belt.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The stick removal mechanism for nut harvesting is a device that is installed over the open top of a nut collection receptacle, such as a mobile cart or the like. The stick removal mechanism and the collection receptacle are moved through an orchard with an associated harvester as it travels through the orchard to pick up the nuts therein.

Figure 1:
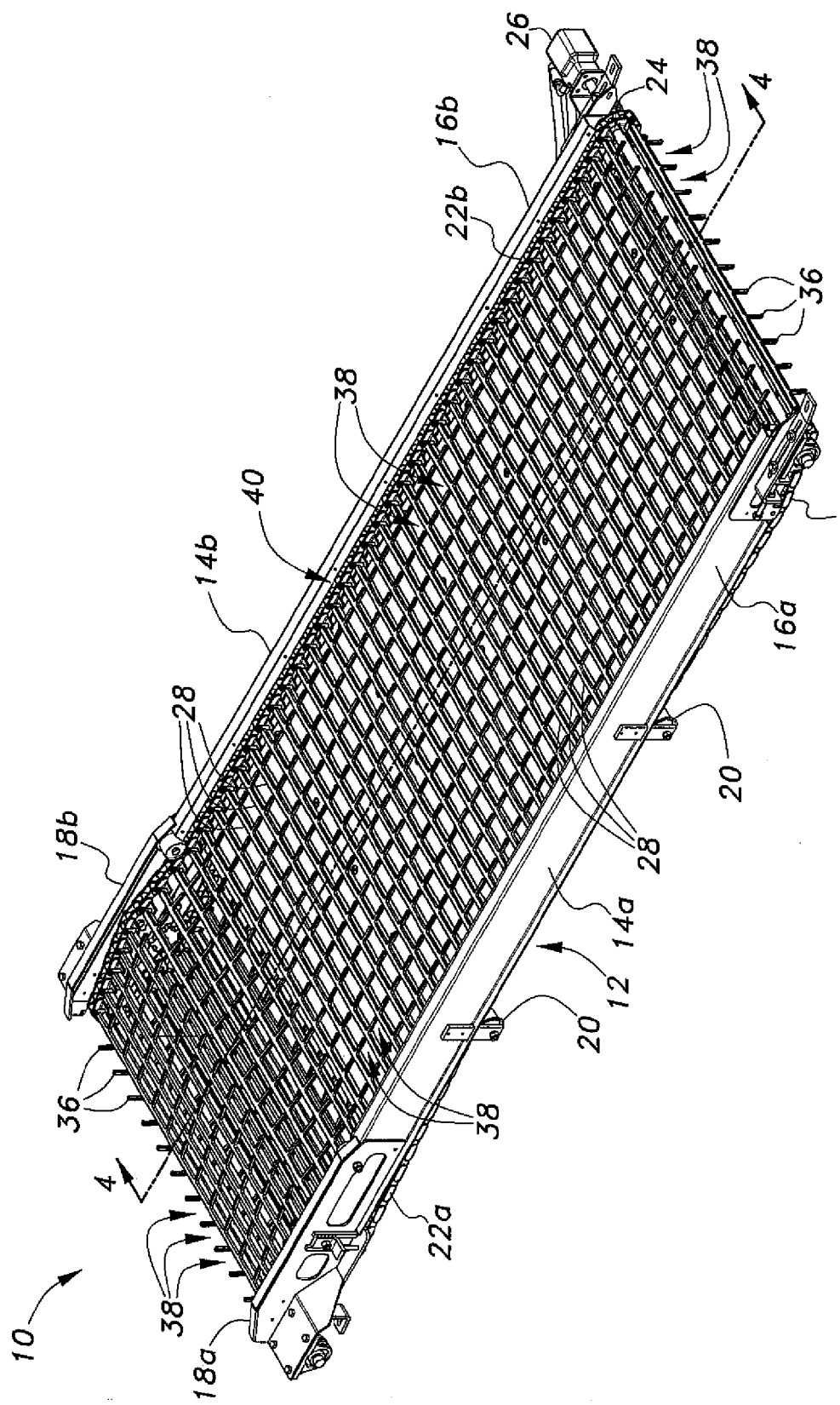
FIG. 1 is a perspective view of a stick removal mechanism for nut harvesting according to the present invention.

FIG. 1 of the drawings provides a perspective view of the stick removal mechanism for nut harvesting 10. The mechanism 10 includes a frame 12 formed of parallel, elongate, laterally opposed first and second side members 14a and 14b, respectively. Each of the side members 14a, 14b has a first end 16a, 16b, and opposite second end 18a, 18b. The two side members 14a, 14b are rigidly connected to one another by conventional lateral cross members and/or other structure.

Each of the two side members 14a, 14b includes a plurality of idler sprockets 20 installed thereon. Endless roller chains 22a and 22b, respectively, pass around or along the various idler sprockets 20 along each of the two side members 14a and 14b. Drive sprockets 24 at the first ends 16a, 16b of the two side members 14a, 14b drive the two chains 22a, 22b by means of a drive motor 26 affixed to the frame 12.

Figure 2:
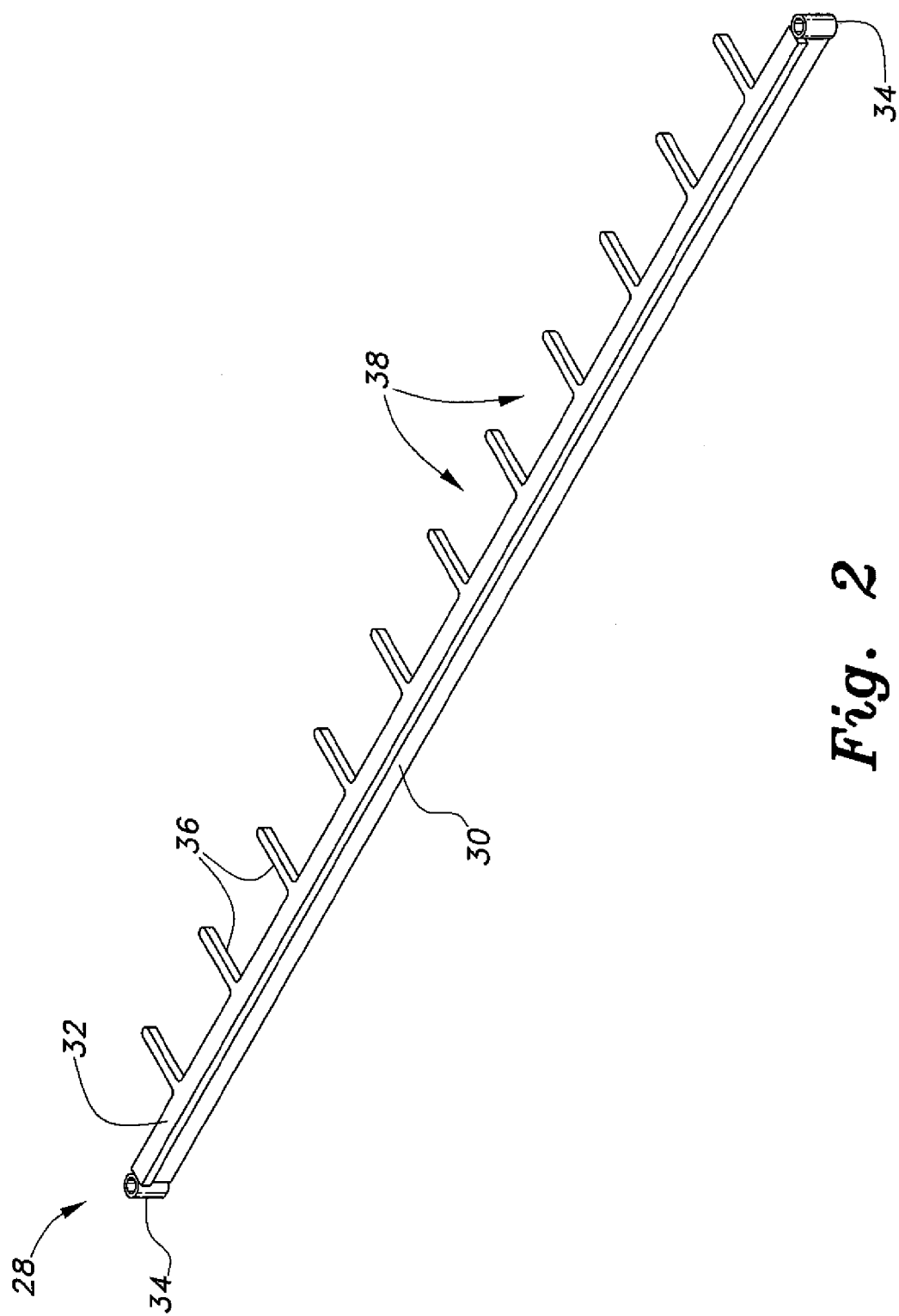
FIG. 2 is a perspective view of a cross member of the stick removal mechanism for nut harvesting according to the present invention.

A plurality of rigid cross members 28 is linked to the two chains 22a, 22b and extends laterally therebetween. FIG. 2 of the drawings provides a detailed perspective view of a single one of the cross members 28. Each cross member 28 preferably comprises two primary components. The first component 30 is preferably formed of a length of rigid steel bar stock in order to contribute to the required strength and rigidity of the crossmember 28. The second component 32 is preferably cut or otherwise formed from a length of steel plate. The two components 30 and 32 are rigidly and immovably affixed to one another to form a single monolithic and homogeneous unit, e.g., by welding or other suitable means. Chain attachment lugs or fittings 34 are welded or otherwise rigidly affixed to the two opposite ends of each cross member 28.

The steel plate component 32 is laser cut or otherwise formed to have a plurality of rigid, mutually parallel fingers 36 extending orthogonally therefrom, i.e., normal to the length of the crossmember 28. As the steel plate component 32 is formed from a flat plate of material, it will be seen that the fingers 36 extend from the cross member 28 in the same plane as the conveyor roller chains 22a and 22b, as apparent in FIGS. 1, 3A, 3B, and 4 of the drawings. (The fingers 36 extending from the cross members 28 as they pass around the sprockets 20 and drive sprockets 24 at the two ends of the mechanism 10 remain parallel and coplanar to the immediate portions or links of the two chains 22a, 22b to which those specific crossmembers 28 are attached.)

The fingers 36 of each cross member 28 define a plurality of nut passages 38 therebetween. The spacing of the fingers 36 is configured to allow the nuts being harvested to pass through the nut passages 38, while the fingers 36 substantially prevent larger sticks, branches, twigs, etc. from passing between the fingers 36. The construction of the cross members 28 from two very rigid and strong components 30 and 32 results in the cross members 28 and the fingers 36 extending from the second components 32 of the cross members 28 greatly resisting bending and/or other damage should a relatively large branch or other large debris become lodged between cross members 28 during operation. The assembly comprising the two roller chains 22a, 22b, the cross members 28, and their fingers 36 forms a continuous and endless conveyor belt 40, in which the fingers 36 carry or sweep any debris carried thereon from the end of the belt 40 as it travels around the sprockets at the end of the frame 12. However, it will be noted that adjacent cross members 28 and their fingers 36 are not in direct contact with one another, but are separate and independent units linked only by their connections to the two roller chains 22a and 22b.

Figure 3A:
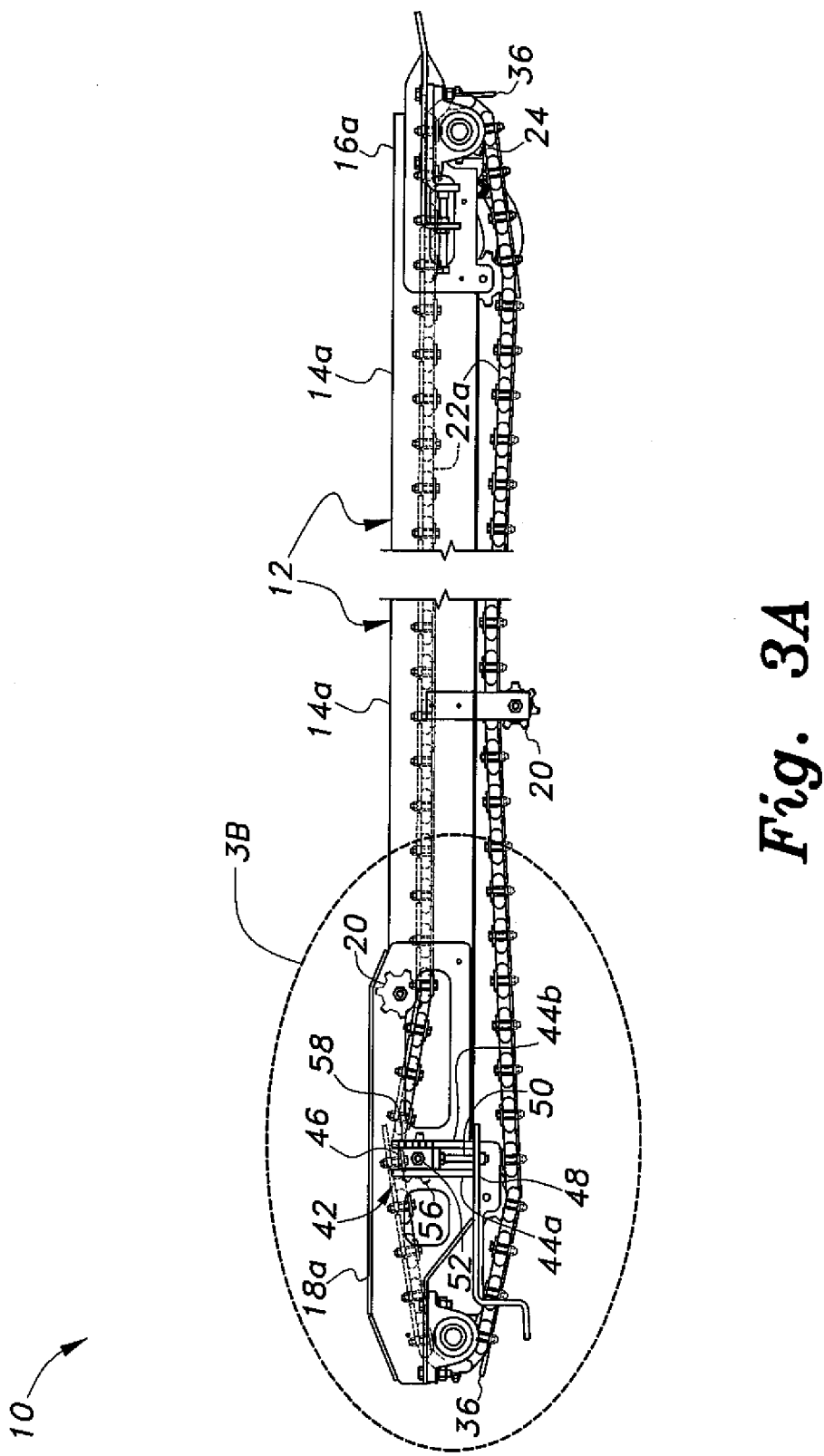
FIG. 3A is a side view of the stick removal mechanism for nut harvesting according to the present invention, showing the agitator mechanism lifted to agitate the roller chains and belt.
Figure 3B:
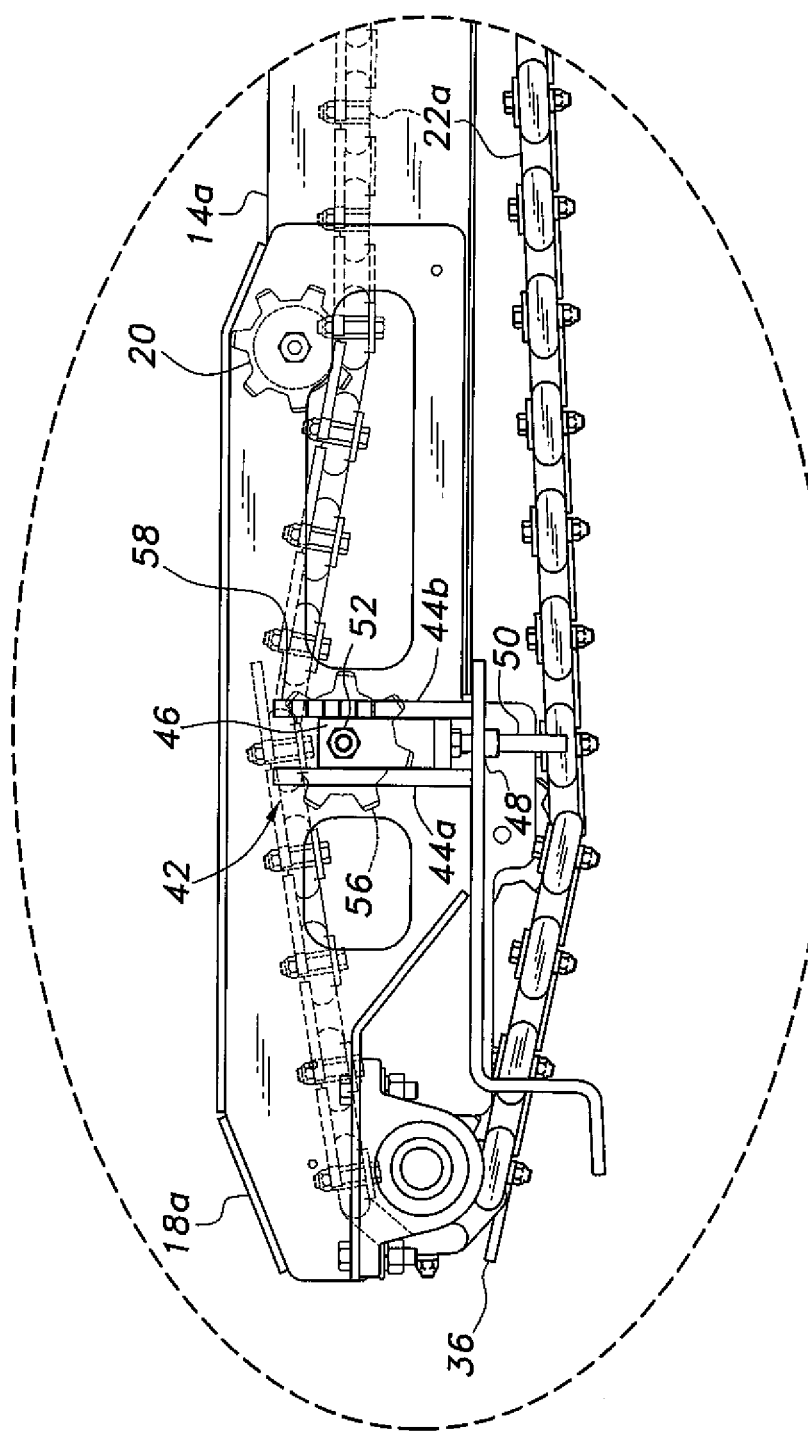
FIG. 3B is a detail elevation view of area 3B of FIG. 3A, but showing the agitator mechanism lowered to reduce agitation.
Figure 4:
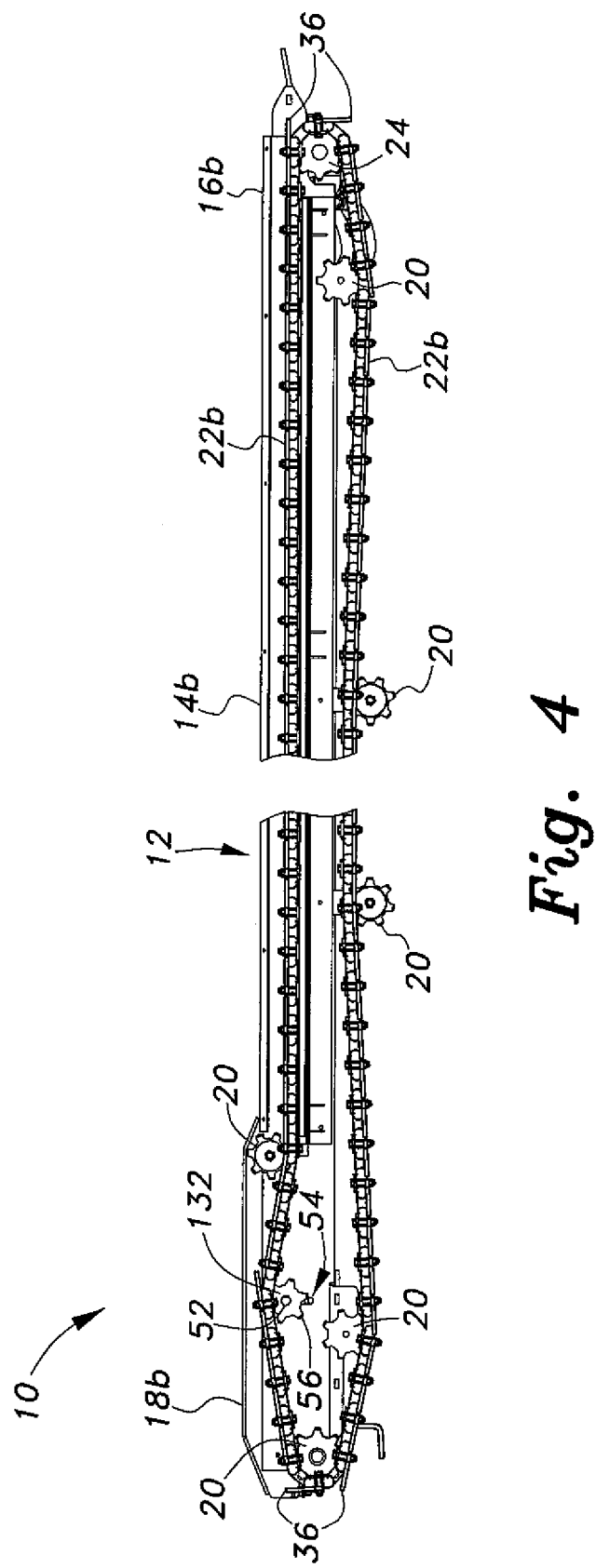
FIG. 4 is a side elevation view in section along lines 4-4 of FIG. 1.

FIGS. 3A, 3B, and 4 illustrate an adjustable agitator mechanism 42 provided with the stick removal mechanism 10. Two such identical mechanisms 42 are provided, one being installed upon each of the two side members 14a and 14b of the frame 12. The agitator mechanisms 42 oscillate the upper part of the chain run vertically as the roller chains 22a, 22b pass thereover, thereby oscillating or agitating the cross members 28 as they pass between the two agitator mechanisms 42. This operation shakes or jars nuts that have been caught in the conveyor belt 40, to fall through the passages 38 and into the underlying receptacle.

Each agitator mechanism 42 comprises a pair of parallel plates 44a, 44b immovably affixed (e.g., welded, etc.) to each side member 14a, 14b, with a selectively adjustable slide 46 residing between the two plates 44a, 44b. An adjustor anchor 48 is immovably affixed to each side member 14a, 14b beneath the slide 46. An adjuster 50 (e.g., a bolt, threaded rod adjustment, or other suitable adjustment means) adjustably extends from the adjustor anchor 48 and communicates with the slide 46. Adjusting the adjustor 50 up and down results in the slide 46 moving up and down between the two plates 44a, 44b.

An agitator sprocket shaft 52 extends from the slide 46 and passes through a passage or vertical slot 54 (a portion of which is shown in FIG. 4) in the corresponding frame side member 14a, 14b. An agitator sprocket 56 is installed upon the distal end of the agitator sprocket shaft 52 on the opposite side of the frame member from the plates 44a, 44b, the slide 46, the adjustor anchor 48, and the adjustor 50. It will be seen that when the adjustor 50 is adjusted downward, as shown in FIG. 3B, the slide 46 and the sprocket shaft 52, and thus the agitator sprocket 56, also travel downward. This reduces the vertical displacement of the agitator sprocket 56 beneath the portion of the roller chain 22a traveling immediately thereover. However, when the adjustor 50 is adjusted to move the slide 46 upward, as shown in FIG. 3A, the sprocket shaft 52 and the agitator sprocket 56 are lifted to displace the chain 22a to a greater extent. The agitator sprocket 56 is relatively small with relatively few teeth, having relatively large angles subtended between adjacent teeth. This causes the roller chain, e.g., chain 22a as shown in FIGS. 3A and 3B, to "jump" as it passes sequentially over each of the teeth of the agitator sprocket 56, thus shaking and jarring the chain(s) at that location and the cross members 28 attached to the chain(s) at that point, thereby also shaking and jarring the fingers 36 extending from the cross members 28.

The amplitude of the periodic lifting and jarring of the roller chains 22a, 22b can be adjusted according to an adjuster height indicator 58 on one or both of the plates 44a and/or 44b. The height or position of the slide 46, and thus the agitator sprocket shaft 52 and its agitator sprocket 56, can be determined relative to this height indicator 58, and the height of the agitator sprocket 56 can be adjusted accordingly, depending upon the nature of the sticks and/or other debris encountered during the nut harvesting operation.

Figure 5:
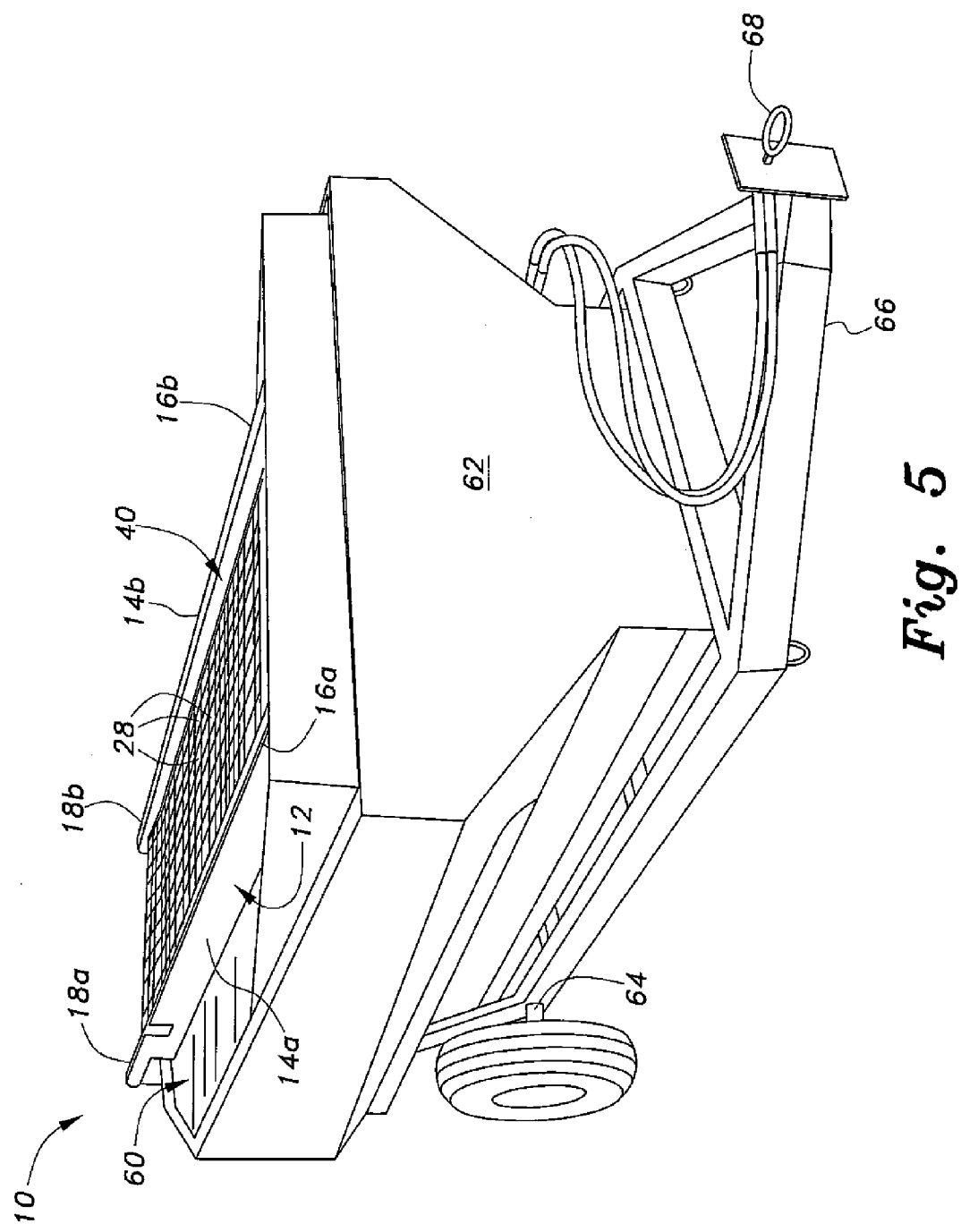
FIG. 5 is an environmental perspective view of the stick removal mechanism for nut harvesting according to the present invention.

FIG. 5 illustrates the installation or placement of the stick removal mechanism 10 and its frame 12 and conveyor 40 over the open top 60 of a nut collection receptacle or container 62. The receptacle or container 62 may comprise any practicable container for the collection of harvested nuts, but most preferably is a trailer having a single axle 64 and a tongue 66 and hitch 68 (e.g., a ring for a pintle type hitch, as shown, or socket for a ball hitch, etc.). In this manner, the receptacle or container trailer 62 may be towed behind a conventional powered implement (e.g., a tractor) while the nut harvester deposits collected nuts (as well as sticks, twigs, and/or other debris) atop the conveyor 40 of the stick removal mechanism 10. The conveyor 40 allows the collected nuts to fall through the interstices or passages 38 defined by the cross member fingers 36, while retaining the debris atop the fingers 36 to fall from the back of the conveyor 40. The result is the collection of nuts substantially free from other debris, and requiring little in the manner of additional separation or removal of debris from the nut collection.

It is to be understood that the present invention is not limited to the embodiments described above, but encompasses any and all embodiments within the scope of the following claims.

I claim:

1. A stick removal mechanism for nut harvesting, comprising:

a frame having parallel, elongate, opposing first and second side members, each of the side members having opposing first and second ends;

a drive sprocket and a plurality of corresponding idler sprockets disposed along each of the side members;

first and second conveyor roller chains disposed along the first and second side members, respectively, the conveyor roller chains extending about the drive sprockets and the corresponding idler sprockets; and a plurality of rigid cross members extending laterally between the conveyor roller chains, each of the cross members having a plurality of rigid fingers extending orthogonally therefrom, the fingers being disposed in the plane of the conveyor roller chains so that adjacent fingers define a corresponding plurality of nut passages therebetween, the conveyor roller chains, the cross-members, and the fingers defining an endless conveyor.

2. The stick removal mechanism fir nut harvesting according to claim 1, further comprising:

an agitator sprocket disposed upon each of the side members, each of the agitator sprockets being in adjustable communication with a respective one of the conveyor roller chains; and an agitator adjustment mechanism disposed upon each of the side members, each of the agitator adjustment mechanisms being in adjustable communication with the corresponding agitator sprocket.

3. The stick removal mechanism for nut harvesting according to claim 2, wherein each said agitator adjustment mechanism comprises:

a pair of parallel plates immovably affixed to a respective one of the side members;

a selectively adjustable slide disposed between the plates;

an agitator sprocket shaft extending from the slide, the corresponding agitator sprocket being disposed upon the agitator sprocket shaft;

an adjuster anchor disposed below the slide and immovably affixed to a respective one of the side members; and a selectively adjustable rod extending from the adjuster anchor, the rod communicating with the slide.

4. The stick removal mechanism for nut harvesting according to claim 3, wherein each said agitator adjustment mechanism further comprises an adjuster height indicator disposed upon at least one of the plates.

5. The stick removal mechanism for nut harvesting according to claim 1, further comprising a receptacle having an open top, the frame and the conveyor being disposed over the open top of the receptacle.

6. The stick removal mechanism for nut harvesting according to claim 5, wherein the receptacle comprises a single axle trailer having a tongue and a hitch.

7. The stick removal mechanism for nut harvesting according to claim 1, wherein each of the cross members comprises:

a rigid length of steel bar stock; and a rigid steel plate having the fingers defined in and extending integrally therefrom, the plate being rigidly affixed to the bar stock.

8. A stick removal mechanism for nut harvesting, comprising:

a frame having parallel, elongate, opposing first and second side members, each of the side members having opposing first and second ends;

a drive sprocket and a plurality of corresponding idler sprockets disposed along each of the side members;

first and second conveyor roller chains disposed along the first and second side members, respectively, the conveyor roller chains extending about the drive sprockets and the corresponding idler sprockets;

a plurality of cross members extending laterally between the first and second conveyor roller chains, the cross members and the conveyor roller chains defining an endless conveyor;

an agitator sprocket disposed upon each of the side members, each of the agitator sprockets being in adjustable communication with a respective one of the conveyor roller chains; and an agitator adjustment mechanism disposed upon each of the side members, each of the agitator adjustment mechanisms being in adjustable communication with the corresponding agitator sprocket.

9. The stick removal mechanism for nut harvesting according to claim 8, wherein each said agitator adjustment mechanism comprises:

a pair of parallel plates immovably affixed to a respective one of the side members;

a selectively adjustable slide disposed between the plates;

an agitator sprocket shaft extending from the slide, the corresponding agitator sprocket being disposed upon the agitator sprocket shaft;

an adjuster anchor disposed below the slide and immovably affixed to a respective one of the side members; and a selectively adjustable rod extending from the adjuster anchor, the rod communicating with the slide.

10. The stick removal mechanism for nut harvesting according to claim 9, wherein each said agitator adjustment mechanism further comprises an adjuster height indicator disposed upon at least one of the plates.

11. The stick removal mechanism for nut harvesting according to claim 8, wherein each said cross member has a plurality of rigid fingers extending orthogonally therefrom, the fingers being disposed in the plane of the conveyor roller chains so that adjacent fingers define a corresponding plurality of nut passages therebetween.

12. The stick removal mechanism for nut harvesting according to claim 11, wherein each of the cross members comprises:

a rigid length of steel bar stock; and a rigid steel plate having the fingers defined in and extending integrally therefrom, the plate being rigidly affixed to the bar stock.

13. The stick removal mechanism for nut harvesting according to claim 8, further comprising a receptacle having an open top, the frame and the conveyor being disposed over the open top of the receptacle.

14. The stick removal mechanism for nut harvesting according to claim 13, wherein the receptacle comprises a single axle trailer having a tongue and a hitch.

15. A stick removal mechanism for nut harvesting, comprising:

a frame having parallel, elongate, opposing first and second side members, each of the side members having opposing first and second ends;

a drive sprocket and a plurality of corresponding idler sprockets disposed along each of the side members;

first and second conveyor roller chains disposed along the first and second side members, respectively, the conveyor roller chains extending about the drive sprockets and the corresponding idler sprockets;

a plurality of cross members extending laterally between the first and second conveyor roller chains, the cross members and the conveyor roller chains defining an endless conveyor, wherein each of the cross members has a plurality of rigid finger extending orthogonally therefrom, the fingers being disposed in the plane of the conveyor roller chains so that adjacent fingers define a corresponding plurality of nut passages therebetween;

an agitator sprocket disposed upon each of the side members, each of the agitator sprockets being in communication with a respective one of the conveyor roller chains; and a receptacle having an open top, the frame and the conveyor being disposed over the open top of the receptacle, the receptacle being a single axle trailer having a tongue and a hitch.

16. The stick removal mechanism for nut harvesting according to claim 15, wherein each of the cross members comprises:
   a rigid length of steel bar stock; and
   a rigid steel plate having the fingers defined in and extending integrally therefrom, the plate being rigidly affixed to the bar stock.

17. The stick removal mechanism for nut harvesting according to claim 15, further comprising an agitator adjustment mechanism disposed upon each of the side members, each of the agitator adjustment mechanisms being in adjustable communication with the corresponding agitator sprocket.

18. The stick removal mechanism for nut harvesting according to claim 17, wherein each said agitator adjustment mechanism comprises:
   a pair of parallel plates immovably affixed to a respective one of the side members;
   a selectively adjustable slide disposed between the plates;
   an agitator sprocket shaft extending from the slide, the corresponding agitator sprocket being disposed upon the agitator sprocket shaft;
   an adjuster anchor disposed below the slide and immovably affixed to a respective one of the side members; and
   a selectively adjustable rod extending from the adjuster anchor, the rod communicating with the slide.

19. The stick removal mechanism for nut harvesting according to claim 18, wherein each said agitator adjustment mechanism further comprises an adjuster height indicator disposed upon at least one of the plates.

* * * * *